3,296,126
DRILLING MUD

Horst Diener, Frankfurt am Main Hochst, and Dieter Ulmschneider, Frankfurt am Main Unterliederbach, Germany, assignors to Kalle Aktiengesellschaft, Wiesbaden-Biebrich, Germany, a corporation of Germany
No Drawing. Filed Dec. 3, 1964, Ser. No. 415,789
Claims priority, application Germany, Dec. 7, 1963,
K 51,561
10 Claims. (Cl. 252—8.5)

This invention relates to an improved drilling mud.

The clay in water mixtures used in deep drilling operations as drilling compositions may be simple suspensions of clay in water or, in some cases, they may be in the form of oil-in-water emulsions. A drilling composition of this kind is known generally as "drilling mud."

Drilling muds lose their stability, i.e., the clay suspended therein flocculates, when their temperature is raised or when their electrolyte content is increased, especially their content of divalent metal ions, which can occur when drilling through strata containing water-soluble salts. Attempts have therefore been made to reduce their sensitivity to temperature and electrolytes. The temperature sensitivity of drilling muds can be advantageously modified by the use of especially suitable varieties of clay, for example the non-hydrolyzable types such as calcium bentonites, attapulgites and sepiolites. Protective colloids that are stable towards divalent metal ions, especially starch, starch derivatives, cellulose derivatives, polyacrylamides and polyacrylates, are added to reduce electrolyte sensitivity.

The present invention provides a drilling mud, i.e. a water-based clay composition as above referred to, that is distinguished by an improved thermal stability, even in the presence of electrolytes. The drilling mud of the invention contains an open-chain poly-N-vinyl carboxylic acid amide as protective colloid. The polymers used as protective colloids in this invention are derivatives of open-chain carboxylic acid amides that contain a vinyl group attached to the nitrogen atom of the amide group. A further substituent can be attached to the carboxylic acid amide group in addition to the vinyl group. Such a substituent may be an alkyl group havinng up to six carbon atoms. The carboxylic acid may be acetic acid or a homologous acid which may contain up to six carbon atoms in addition to the carbonyl group.

The vinyl carboxylic acid amide polymers present in the drilling mud as protective colloids in accordance with the invention may be products having different mean degrees of polymerization. Depending on requirements, polymers having a K-value, for example, of 20, or polymers having a K-value, for example, of 140 may be most suitable for the purpose. The K-value is the constant widely used in the plastics industry to denote viscosity; it is obtained from Fikentscher's equation relating to the intrinsic viscosity of plastic polymers. A low K-value corresponds to a low degree of polymerization.

The amount of vinyl carboxylic acid amide polymer present in the drilling mud is also dependent on the conditions obtaining during a specific operation, one factor being the nature of the earth formation through which drilling is to take place. The amount of protective colloid generally used is between 5 and 50 kilograms per cubic meter of drilling mud. Other protective colloids may also be present in the drilling mud together with the protective colloids to be used in accordance with the invention.

The amount of clay present in the drilling mud, as in other kinds of drilling mud, depends on the desired carrying capacity, which determines the lower limit of the clay content, and on the efficiency of the pumps, which determines the upper limit of the clay content. Both limits are influenced by the protective colloid present in the drilling mud in accordance with the invention. In general, however, the concentration of clay should not be below 2 percent and not above 10 percent by weight.

Drilling muds prepared in accordance with the invention remain stable at bore hole temperature of 250° C. and higher and in the presence of high concentrations of polyvalent metal ions, and can thus function with undiminished efficiency in such circumstances.

The following example further illustrates the invention:

Example

Two batches of drilling mud having the following compositions were prepared:

Fresh water drilling mud:
    8.0% by weight of calcium bentonite
    0.5% by weight of NaOH
    1.0% by weight of poly-N-vinyl-N-methylacetamide ($K=85$)
    90.5% by weight of water Electrolyte drilling mud:
    8.0% by weight of calcium bentonite
    1.0% by weight of poly-N-vinyl-N-methylacetamide ($K=85$)
    10.0% by weight of NaCl
    15.0% by weight of $MgCl_2 \cdot 6H_2O$
    10.0% by weight of $CaCl_2 \cdot 6H_2O$
    56.0% by weight of water Stability tests were made with the above drilling muds. Their filterability according to A.P.I. (American Petroleum Institute) code 29 was taken as a measure of their stability.

The drilling muds were forced through a filtering surface having an area of $45.8 \pm 0.7$ square centimeters under a pressure of $7 \pm 0.7$ atmospheres (gauge). The amount of liquid forced through the filter in the course of 30 minutes was then determined. The filter used was a Whatmann No. 50, round filter paper (9 cm.).

Filtration measurements of the type referred to are accepted in the drilling art as a measure of the suitability of drilling muds. The lower the degree of "water loss," i.e., the lower the amount of water passing through the filter, the more suitable is the drilling mud. A water loss of up to 20 ml. under the test conditions described above may be considered to be indicative of a highly stable colloidal system.

The heat-sensitivity of the above fresh-water drilling mud was determined in the absence of electrolytes, and that of the above electrolyte drilling mud was determined in the presence of electrolytes. The results of the tests are given in the tables below, the drilling muds prepared in accordance with the present invention being indicated as "Invention type."

One water-loss test was carried out without the drilling mud being subjected to an elevated temperature, and four others were carried out for 10 hours each at 100° C., 150° C., 200° C., and 250° C. respectively. The amount of water that had passed through the filter was measured after the test portions had cooled.

The symbol $\infty$ in the following tables indicates that the total amount of liquid present in the test portion had passed through the filter before the 30-minute period had expired.

FRESH-WATER DRILLING MUD

| Temperature, °C | 20 | 100 | 150 | 200 | 250 |
|---|---|---|---|---|---|
| | \multicolumn{5}{c}{Water loss in milliliters} | | | | |
| Invention type | 7.0 | 7.0 | 6.5 | 6.3 | 5.1 |
| Starch type | 5.0 | 6.0 | 48.0 | ∞ | ∞ |
| Cellulose ether type | 5.1 | 5.3 | 5.9 | 52.0 | ∞ |
| Polyacrylate type | 6.0 | 5.5 | 8.1 | 8.1 | 34.0 |

ELECTROLYTE DRILLING MUD

| Temperature, °C | 20 | 100 | 150 | 200 | 250 |
|---|---|---|---|---|---|
| | | Water loss in milliliters | | | |
| Invention type | 4.0 | 4.0 | 4.4 | 3.7 | 3.5 |
| Starch type | 3.5 | 4.1 | ∞ | ∞ | ∞ |
| Cellulose ether type | 46.0 | ∞ | ∞ | ∞ | ∞ |
| Polyacrylate type | 27.0 | 15.5 | ∞ | 77.0 | ∞ |

For comparison purposes in the above tables, tests were carried out with the same amounts of drilling muds of the same composition with the exception that as protective colloids starch, cellulose ether and polyacrylate were used. The results indicated in the tables show that of all the drilling muds tested, it is only the types prepared in accordance with the invention that have very good filtration properties even in the presence of electrolytes. The only other drilling mud that proved usable at temperatures up to 250° C. was the fresh-water drilling mud containing polyacrylate, although its degree of water loss was undesirably high at that temperature. Apart from the invention type, none of the electrolyte drilling muds was usable at temperatures above 100° C. The drilling mud prepared in accordance with the invention, on the other hand, still displayed good filtration properties at 250° C.

The same amount of drilling mud having the same ingredients but containing poly-N-vinyl-N-propylpropionic acid amide having a K-value of 116 as protective colloid showed the same good behavior.

It will be obvious to those skilled in the art that many modifications may be made within the scope of the present invention without departing from the spirit thereof, and the invention includes all such modifications.

What is claimed is:

1. A drilling mud comprising water, a clay in a concentration of 2 to 10 percent by weight, and, as a protective colloid, a poly-N-vinyl carboxylic acid amide having a K-value of 20 to 140 and being present in an amount sufficient to reduce water loss, the carboxylic acid precursor of the amide having 2 to 7 carbon atoms.

2. A drilling mud according to claim 1 in which the amide is poly-N-vinyl-N-methylacetamide.

3. A drilling mud according to claim 1 in which the amide is poly-N-vinyl-N-propylpropionic acid amide.

4. A drilling mud according to claim 1 in which the amide group has an alkyl group of 1 to 6 carbon atoms linked thereto.

5. A drilling mud according to claim 1 in which the amide is present in a quantity in the range of about 5 to 50 kilograms per cubic meter of mud.

6. In a process for drilling a borehole in earth formations, the improvement which comprises forcing a drilling mud into the borehole under pressure, the mud comprising water, a clay in a concentration of 2 to 10 percent by weight, and, as a protective colloid, a poly-N-vinyl carboxylic acid amide having a K-value of 20 to 140 and being present in an amount sufficient to reduce water loss, the carboxylic acid precursor of the amide having 2 to 7 carbon atoms.

7. A process according to claim 6 in which the amide is poly-N-vinyl-N-methylacetamide.

8. A process according to claim 6 in which the amide is poly-N-vinyl-N-propylpropionic acid amide.

9. A process according to claim 6 in which the amide group has an alkyl group of 1 to 6 carbon atoms linked thereto.

10. A process according to claim 6 in which the amide is present in a quantity in the range of about 5 to 50 kilograms per cubic meter of mud.

References Cited by the Examiner

UNITED STATES PATENTS

| 2,231,905 | 2/1941 | Hanford et al. | 260—89.7 |
| 2,718,497 | 9/1955 | Oldham et al. | 252—8.5 |
| 3,025,234 | 3/1962 | Canterino | 252—8.5 |

FOREIGN PATENTS 672,427  10/1963  Canada.

SAMUEL H. BLECH, *Primary Examiner.*

ALBERT T. MEYERS, LEON D. ROSDOL, *Examiners.*

H. B. GUYNN, *Assistant Examiner.*